US008422798B1

(12) United States Patent
Witzgall

(10) Patent No.: US 8,422,798 B1
(45) Date of Patent: Apr. 16, 2013

(54) MAGNITUDE IMAGE COMPRESSION

(75) Inventor: Hanna Elizabeth Witzgall, Chantilly, VA (US)

(73) Assignee: Science Applications International Corporation, McLean, VA (US)

( * ) Notice: Subject to any disclaimer, the term of this patent is extended or adjusted under 35 U.S.C. 154(b) by 990 days.

(21) Appl. No.: 11/898,763

(22) Filed: Sep. 14, 2007

(51) Int. Cl.
G06K 9/36 (2006.01)
G06K 9/46 (2006.01)

(52) U.S. Cl.
USPC ........................................... 382/232

(58) Field of Classification Search .................. None
See application file for complete search history.

(56) References Cited

U.S. PATENT DOCUMENTS

| | | | | |
|---|---|---|---|---|
| 4,801,939 | A | | 1/1989 | Jones ................................ 342/25 |
| 5,991,454 | A | * | 11/1999 | Fowler ............................ 382/251 |
| 6,201,879 | B1 | * | 3/2001 | Bender et al. .................. 382/100 |
| 6,246,796 | B1 | * | 6/2001 | Horikoshi et al. ............. 382/232 |
| 7,006,031 | B1 | | 2/2006 | Abatzoglou et al. ......... 342/25 A |
| 7,009,533 | B1 | * | 3/2006 | Wegener ........................... 341/76 |
| 7,103,537 | B2 | * | 9/2006 | Witzgall et al. ................ 704/219 |
| 7,136,010 | B2 | | 11/2006 | Cirillo et al. ................. 342/25 R |
| 7,411,540 | B1 | | 8/2008 | Lopez et al. ................. 342/25 R |
| 7,426,463 | B2 | * | 9/2008 | Witzgall et al. ................ 704/219 |
| 7,773,276 | B2 | | 8/2010 | Hoskins et al. .................. 359/32 |
| 2004/0160353 | A1 | | 8/2004 | Cirillo et al. ................ 342/25 R |
| 2005/0128120 | A1 | | 6/2005 | Cirillo et al. ........................ 342/1 |
| 2007/0257835 | A1 | | 11/2007 | Cirillo et al. .................. 342/195 |

OTHER PUBLICATIONS

Witzgall, Hanna E., "Parametric Modeling of Detected SAR Imagery for Compression," *IEEE*, 6 pp., Copyright 2007.
File History for U.S. Appl. No. 11/267,177, filed Nov. 7, 2005, Titled: "Image Compression".
Witzgall, Hanna E., et al., "Exploiting Fundamental Properties of SAR Data for Compression of Tactical Sar Imagery," *Proc. of 26th IEEE Aerospace Conference*, Big Sky, MT, Mar. 2005, 9 pp.
Witzgall, Hanna E., et al., "Compression of Tactical Real-Valued SAR Imagery in the Complex Sar Phase History Domain," Proc. 38th *Asilomar Conference Signals, Syst. Comput.*, Pacific Grove, California, Nov. 2004, 4 pp.

(Continued)

*Primary Examiner* — Samir Ahmed
(74) *Attorney, Agent, or Firm* — King & Spalding LLP

(57) ABSTRACT

Embodiments of the invention view image intensity data as a spectrum of underlying wave forms. The spectrum of these waves can be approximated using spectral estimation techniques where the spectrum parameters constitute the compressed image. The image's underlying wave forms can be recovered using an inverse Fourier transform. The original image can also be symmetrically extended prior to the transform to preserve real valued transformed data and model parameters. The modeling method is typically based on a linear predictive methodology to obtain the spectrum parameters. Other transforms include a 2-D Fourier transform that transforms the image into a holographic representation similar to synthetic aperture radar (SAR) phase history. This 2-D waveform holographic format can be decorrelated into 1-D planar waves by applying a 1D Fourier transform. This process enables 1-D linear predictive modeling to obtain the spectral parameters. For compression applications the model parameters are preferably quantized.

2 Claims, 3 Drawing Sheets

OTHER PUBLICATIONS

Witzgall, Hanna E., et al., "Detection Performance of the Reduced-Rank Linear Predictor Rocket," *IEEE Transactions on Signal Processing*, vol. 51, No. 7, Jul. 2003, pp. 1731-1738.

Eichel, Paul, et al., "Compression of Complex-Valued SAR Images," *IEEE Transactions on Image Processing*, vol. 8, No. 10, Oct. 1999, pp. 1483-1487.

Soong, Frank K., et al., "Optimal Quantization of LSP Parameters," *IEEE Transactions on Speech and Audio Processing*, vol. 1, No. 1, pp. 15-24, Jan. 1993.

Paliwal, Kuldip K., et al., "Efficient Vector Quantization of LPC Parameters at 24 Bits/Frame," *IEEE Transactions on Speech and Audio Processing*, vol. 1, No. 1, pp. 314, Jan. 1993.

Sayood, Khalid, "Introduction to Data Compression," Morgan Kaufmann Publishers, Inc., San Francisco, California, Copyright 1996 (Cover, Copyright Page, and Table of Contents), 8 pages.

Hayes, Monson H., "Statistical Digital Signal Processing and Modeling," John Wiley & Sons, Inc., New York, New York, Copyright 1996 (Cover, Copyright Page, and Table of Contents), 7 pages.

Young-Ho, Seo, et al., "Data Compression Technique for Digital Holograms Using a Temporally Scalable, Coding Method for 2-D Images," *IEEE International Symposium on Signal Processing and Information Technology*, pp, 326-331, 2006.

* cited by examiner

MAGNITUDE IMAGE COMPRESSION

CROSS-REFERENCE TO RELATED APPLICATIONS

This application is related to application Ser. No. 11/267,177 filed Nov. 7, 2005.

FIELD OF THE INVENTION

Embodiments of the invention disclosed herein relate to data compression. More specifically, some embodiments relate to compression of image data.

BACKGROUND OF THE INVENTION

Most existing image compression algorithms focus on the characteristics of real-valued intensity images. As a basis for compression, most techniques attempt to exploit local correlations among data elements, e.g., pixel intensities. Linear prediction is applied to image compression mostly for lossless compression applications that seek to capture the local correlation among pixel intensities using very low order predetermined linear filters. The error residual output of the filters are then encoded and transmitted to the receiver. Longer prediction filters are not helpful for compressing image pixel intensity data since the correlations are localized.

The transform coding used in JPEG is the most popular approach for lossy image compression. It also tries to capture the local correlations in image intensities by dividing the figure into small 8×8 blocks of data. These localized blocks are transformed using a two-dimensional Discrete Cosine Transform (DCT) and the largest transform coefficients are retained and encoded for transmission. JPEG 2000 is a recent image compression standard based on a wavelet approach that uses sub-banding to decompose the image into low-pass and high-pass regions. The outputs of the filter banks are down-sampled, quantized, and encoded. The decoder decodes the coded representations, up-samples and reconstructs the signal using a synthesis filter bank. In JPEG 2000 the filter banks are also predetermined and are independent of the source data. The information necessary to reconstruct the image comes from transmitting selected outputs of the analysis filters.

BRIEF SUMMARY OF THE INVENTION

The invention includes methods, systems, and computer program products for image compression. Various embodiments of the invention include steps, modules and subsystems for performing the following activities. Pixel intensity data is viewed as a Fourier spectrum of underlying wave data. The image data is transformed into the underlying wave data whose characteristic frequencies are captured with a linear predictive model (LP). The underlying wave data will be referred to as a holographic data representation that facilitates estimating the parametric representation of the image.

In some embodiments, a one-dimensional Fourier transform is performed on the image rows to obtain the data upon which the linear prediction (LP) model parameters are estimated. The image is then the spectrum of this transformed data which can be approximated with an auto-regressive spectrum model parameterized from the LP coefficients.

In some embodiments, a two-dimensional Fourier transform is applied to obtain a holographic representation of the data. A subset of the holographic data may be selected for modeling. This subset may be further decorrelated by sub-banding the data to facilitate 1-D linear predictive modeling and to obtain the LP parameters.

In some embodiments model parameters are quantized.

Optionally, the subset of the holographic representation can be less than all of the holographic representation. For example, in some embodiments, a subset is a plurality of complete rows.

In some embodiments the image data is symmetrically extended to preserve real-valued data upon which to train the LP parameters after the transformation.

Other embodiments of the invention include methods, systems, and computer program products for communicating images. In addition to the activities described above, these embodiments involve communicating the model parameters to a destination. At the destination an image is synthesized from the parameters of the auto-regressive spectrum model. In some embodiments, the destination and source are co-located. In still further embodiments, the decompression steps are performed at a destination other than the computer platform where compression is performed.

BRIEF DESCRIPTION OF THE SEVERAL VIEWS OF THE DRAWING

Other objects, features, and advantages of the present invention will become more apparent from the following detailed description of the preferred embodiment and certain modifications thereof when taken together with the accompanying drawings in which.

DETAILED DESCRIPTION OF THE INVENTION

Figure 1:
FIG. 1 illustrates an original image and an image reconstructed after being compressed in accordance with embodiments of the invention.

As required, detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Embodiments of the present invention employ parametric spectrum estimation techniques that have more similarity to the methods used for speech compression than traditional image compression. Speech compression techniques rely on the validity of the vocal tract to be effectively modeled by a parametric source description. Compression based on a parametric model can achieve high compression ratios for a valid parametric source, since only the model parameters need be transmitted to reconstruct an estimate of original data. Although parametric analysis/synthesis techniques have been very successfully applied to speech compression, these source modeling techniques have not been successfully employed before for image compression. One reason that typical image compression techniques do not rely on adaptive model-based architectures is because it is generally believed that while speech can be modeled as the output of a linear filter, most images cannot. Thus the absence of strong global correlations in the pixel intensities across an image discourages use of adaptive analysis/synthesis compression architectures that rely on the availability of stationary data to train a parametric model of the source.

Embodiments of the invention view the image as a spectrum of underlying plane waves. By transforming the image into its wave description, typically with a Fourier transform, the underlying wave data can be recovered. An approximation of the image can be formed as an auto-regressive spectrum whose parameters are computed from the linear prediction coefficients modeling the wave nature. This is the reverse of the standard discrete cosine transform (DCT) approach to image compression, which views the image as a sum of cosines. Some embodiments of the invention first transform the image data (e.g., pixel intensities) into a wave format that replaces local correlations in pixel intensities with global correlations that remain mathematically stationary throughout the transformed data. This allows a useful formation of model parameters based on a relatively large collection of training data with the same statistics.

The present disclosure refers to the transformed pixel intensity data as the image's "holographic representation" since it exhibits holographic properties in the sense that all regions of the transform contain the spatial frequencies present throughout the image—similar to the way an optical hologram contains all spatial frequencies present in the imaged object. Typically, the holographic representation is achieved by applying a two-dimensional Fourier Transform (2-D FT) to the pixel intensities of the image. This transforms pixel amplitudes into a complex 2-D plane wave whose frequencies in the horizontal and vertical directions correspond to the horizontal and vertical positions of the pixel. Thus the 2-D FT transform uncovers a natural wave structure underlying the image. In this representation, the data are statistically stationary since the localized pixel energy has now been spread across the entire data representation in the form of a 2-D plane wave. The pixel frequencies are plane waves adding constructively and destructively in the holographic representation. The presence of the complex wave forms at each point in the transformed domain means that the transformed data can be effectively modeled with adaptive linear filter techniques, such as Linear Predictive Coding (LPC). The stationarity of the transformed data also allows the image data to be modeled using only a subset of the transformed data to capture the data statistics. One particular LPC approach that can be utilized to model the transformed data is autoregressive (AR) modeling.

Once the transformed data have been modeled, the model parameters are quantized, encoded, and transmitted to a receiver (or stored locally) for future reconstruction and viewing. The image is reconstructed by decoding the model parameters and generating the auto-regressive spectrum estimate from the decoded model parameters. Note that the auto-regressive spectrum can be computed directly from the AR model parameters without the intervening step of synthesizing the holographic data. This approach is fast and enables high compression ratios since it requires that only the quantized model parameters be transmitted to the receiver to synthesize the image. FIG. 1 provides an example of an original image 110 and a reconstructed image 120 synthesized using only the AR model parameters of the original image.

The compression of an image may be further increased with only gradual degradation in the reconstructed image by taking advantage of another property of the holographic representation. Since the holographic domain is composed of the 2-D plane waves of the pixel values, the pixel values are represented in all portions of the holographic data. This means that only portions of the holographic data actually need to be modeled and encoded. The effect of selecting only a portion of the holographic data to model results in a lower resolution reconstructed image; however the image degradation is gradual when compared to the increase in compression. One difference between embodiments of the present invention and typical speech processing is that speech waveform data does not have the holographic property of the transformed image data. In other words, speech compression cannot selectively omit certain regions of its data and still recreate a close representation of the original signal.

Figure 2:
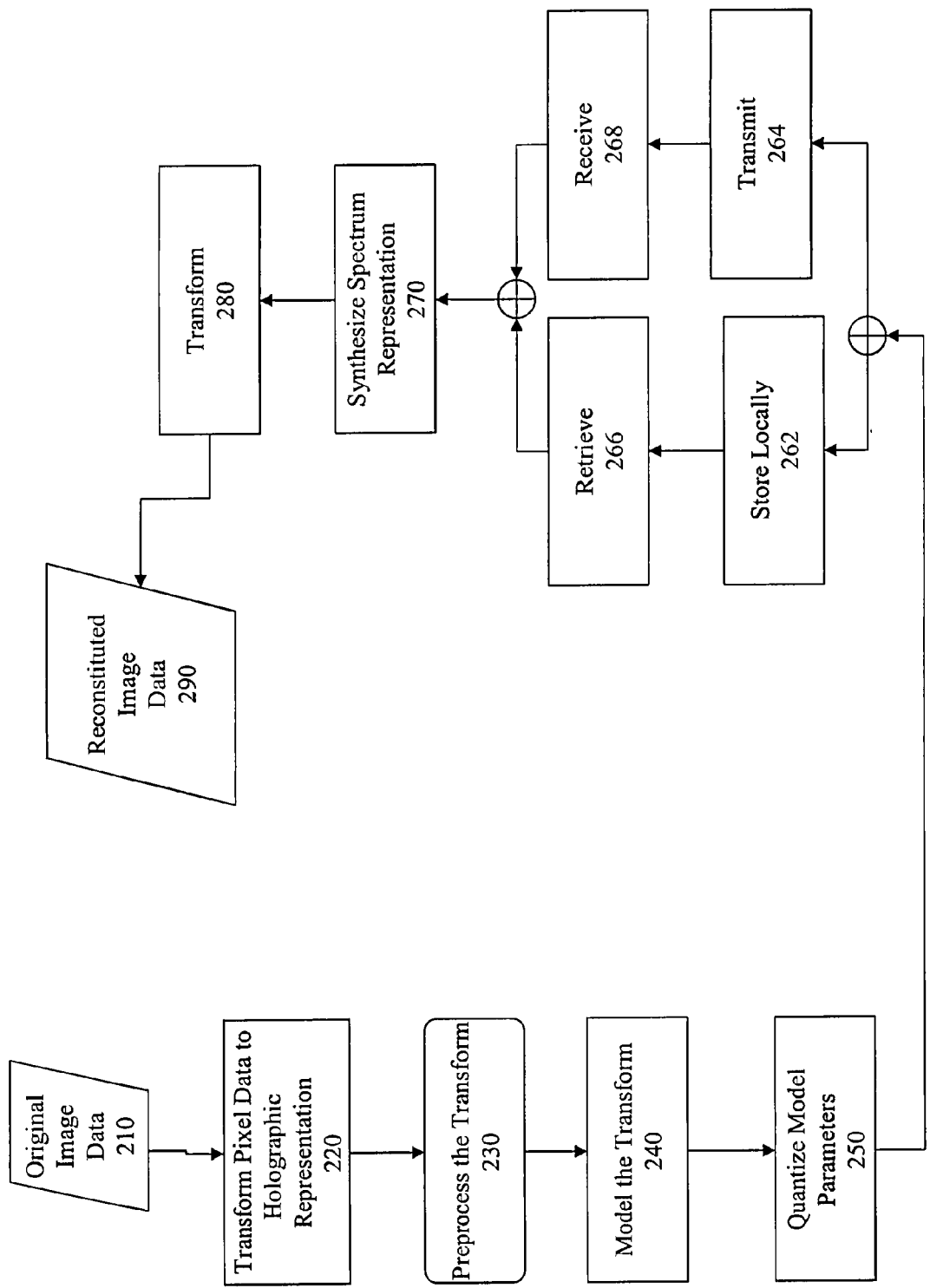
FIG. 2 illustrates methods of the invention.

Subsequent paragraphs provide detailed description of various embodiments of the invention. FIG. 2 provides an overview of the method illustrating, among other things:
- transforming 220 original image data 210 into a holographic representation amenable to modeling;
- pre-processing the holographic representation in some cases (e.g., selecting a portion of the holographic representation and performing a discrete Fourier transform ("DFT") on the columns) 230;
- modeling the holographic representation or its preprocessed form 240;
- quantizing the model parameters 250;
- either storing the quantized model parameters locally 262 and retrieving the same 266 or transmitting the quantized model parameters to a different computer 264 and receiving the same 268;
- creating a synthesized spectrum representation from model parameters 270; and
- transforming 280 the synthesized spectrum representation into a reconstituted image 290.

Embodiments of the invention have applicability to Synthetic Aperture Radar (SAR) image compression. SAR is a remote sensing technology that synthesizes an antenna aperture using the motion of a radar transmitter to yield high spatial resolution radar images. Applying a 2D DFT to the phase history data of a SAR image forms a complex image array. The magnitude of elements in the complex image array is used to form a viewable SAR image. Thus, a viewable SAR image is formed from the 2D spectrum of its phase history representation which is the same way this invention views standard EO imagery, i.e. as a spectrum of underlying waveforms.

Figure 3:
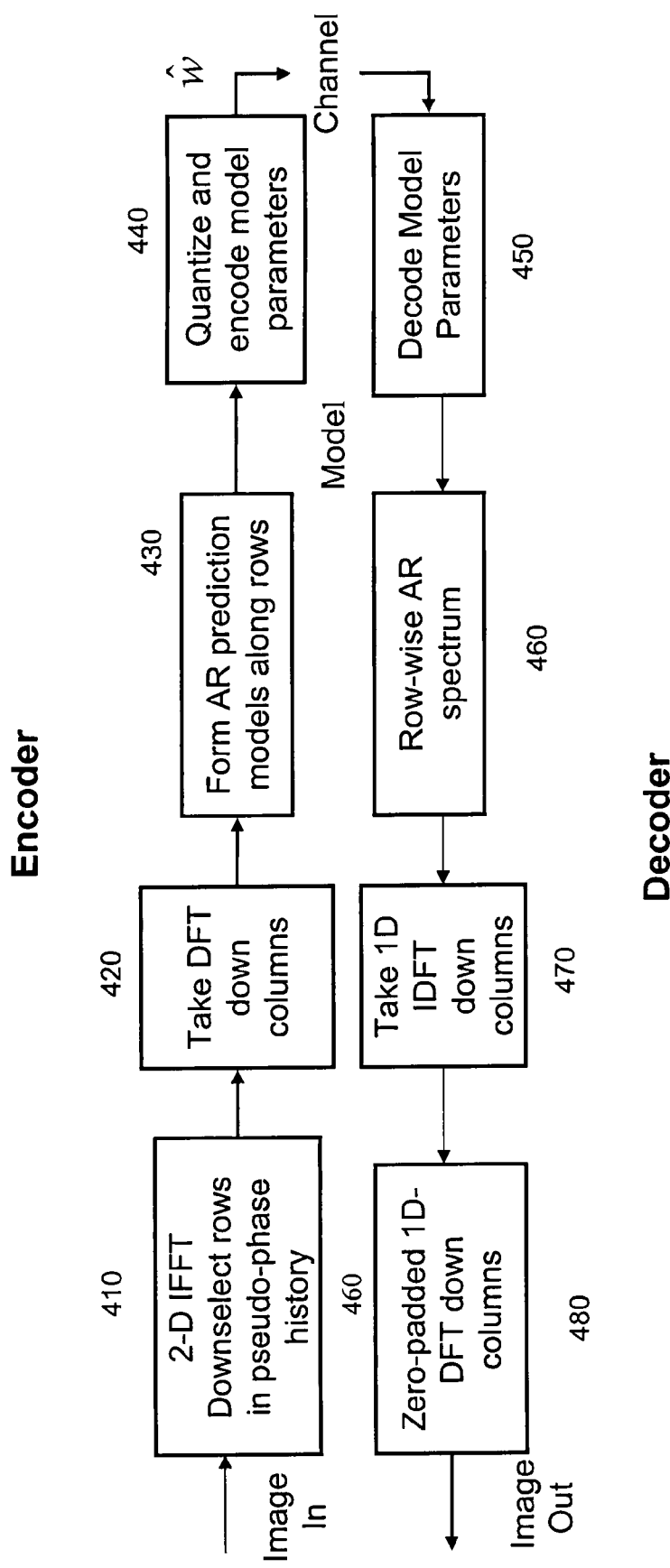
FIG. 3 illustrates methods of the invention as applied to Synthetic Aperture Radar magnitude image data.

Since the phase history representation of a SAR image is actually constructed from the strong correlated exponentials embodying the strong radar scatters, an embodiment of the present invention is well suited to compressing magnitude SAR imagery. In particular, one may obtain the actual SAR phase history by taking a 2-D inverse transform of the complex representation of its image or from a pseudo-phase history by taking a 2-D inverse DFT of the magnitude image data. Like the phase history, the pseudo-phase history is both mathematically stationary and comprises correlated exponentials and thus may advantageously be used to compress the image. FIG. 3 illustrates the combination of DFTs with the linear modeling to implement a method of the invention.

In what follows, the discussion refers to operations on the pseudo-phase history to obtain compression of magnitude image data. First, a two-dimensional inverse DFT is applied to the magnitude image data to obtain a pseudo-phase history (underlying wave data) and a subset of the rows of the pseudo-phase history are selected for modeling 410. Then, a DFT is applied 420 to each column of the 2D pseudo-phase history of an image to de-correlate the 2D complex exponentials of the pseudo-phase history into rows of 1D complex exponentials, eliminating the need to model 2D statistics. Note that for magnitude SAR compression where the complex phase history is available, one of ordinary skill in the art will recognize that the linear modeling may be applied directly to the complex SAR phase history to obtain the AR models approximating the magnitude SAR imagery.

In some embodiments it is not necessary to take a 2-D DFT to go into the holographic representation. For example, some embodiments of this invention view each row of the image as a 1-D spectrum and its underlying wave forms are found by taking the inverse DFT of each row. The image row can then be represented simply as the AR spectrum of that transformed row data. This avoids the need to take a 2-D inverse Fourier transform, followed by a 1-D Fourier transform to decorrelate the data.

Furthermore in some embodiments the AR model coefficients representing the spectrum of each row can be further compacted by applying the same compression process to each column to form a fully separable 2-D approximation of the image. Note that one of ordinary skill in the art will recognize that the linear modeling may be applied equally well initially to the rows or columns of the image.

In some embodiments the image data is symmetrically extended so that the transformed data is real-valued enabling real valued model coefficients.

The AR models for each row are formed using standard linear prediction 430, which is an effective technique for finding models of stationary correlated data sets. The modeler uses weighted linear combination of previous signal values to model the current value. Weight coefficients, w, are found using the normal equations that find the expected correlations between past and current values for stationary sources. A covariance matrix of these coefficients with Toeplitz symmetry is formed by zero padding. This symmetry allows a computationally efficient solution to w, e.g., using the popular Levinson-Durbin recursion. In other embodiments, adaptive analysis/synthesis approaches to modeling that are known to those skilled in the art may be used in place of Linear Prediction Coding. The coefficients are then quantized 440.

Since linear predictive coefficients are known to be sensitive to quantization effects, quantization in the present embodiments is preferably performed on an alternate representations, including but not limited to reflection coefficients, line spectral pairs or log area ratios. For example the line spectral pair represents the AR coefficients w, as a pair (symmetric and anti-symmetric) of polynomials. The roots of each polynomial come in predictable pairs so that there is still the same number of coefficients to quantize. For example each positive frequency has its negative counterpart and the magnitudes are reflected in pairs around a unit circle. Therefore, by quantizing half the roots of both polynomials, all the model parameters are present.

Additional techniques can be applied to improve the compression performance of the quantized model coefficients. For example, one embodiment may utilize the strong correlation between model parameters from row to row, by using a differential pulse compression method (DPCM). The compression technique might be further enhanced by performing trellis coded quantization (TCQ) 440 to columns of model parameters prior to applying DPCM to the parameter rows. TCQ uses a Viterbi algorithm to select the path, through a state machine, that causes the least amount of quantization distortion. The branches of the state machine refer to specific quantization levels. For illustration, four states can be used with two branches going in and out of each state, for a total of eight quantization levels. Other quantization methods know to those skilled in the art, e.g., uniform, scalar, vector, Huffman, arithmetic, vector codebook, quantization, split matrix, can be used in place of TCQ.

Quantized model parameters, $\hat{w}$, represent a compressed representation of the original image. Among other things, this compressed representation can be stored for later retrieval within the system that compressed the image, written to removable memory for transfer to another location or archive, and transmitted over a communications medium to a receiver at a destination.

At the destination, or upon retrieval from a storage medium, the model parameters may be decoded 450 and the weights may be used to compute the spectrum of the AR model 460 directly from well-known formulas. This computation of the AR spectrum directly from the model parameters eliminates the need to compute a DFT for each row to reconstruct the image. Essentially, the spectrum of the AR model formed from a row of pseudo-history data is the corresponding image data for that row.

The resulting spectrum representation of the image data may then be used to reconstitute the image data by computing a 1-D DFT 470 along the columns of the spectrum representation. Zero-padding and further transformation 480 can render the reconstituted image in a size corresponding to the original image. In this fashion, embodiments of the invention combine the efficiency of model-based compression with an AR spectrum reconstruction technique to achieve compression gain with acceptable loss viewable image quality.

Not all of the holographic representation needs to be used in order to produce a model that will result in a good approximation of the original image. Since the dominant frequencies are found throughout the holographic representation, those can be captured in smaller segments (e.g., fewer rows or fewer columns) of the holographic representation. The reconstructed AR spectrum representation can be zero-padded so that the transform back to magnitude imagery is the same size as the original image. Thus the holographic representation can be used to further compress the image at a cost of decreased resolution.

While an AR spectrum was presented as an illustrative embodiment, any spectrum estimation technique can be applied to estimate the image content to those skilled in the art.

The above-described system can be implemented on a computing device, such as a personal computer, Personal Digital Assistant (PDA), internet enabled telephone, dedicated image compression/decompression device, or the like, or a separate programmed general purpose computer having a image management capabilities. Additionally, the systems and methods of this invention can be implemented on a special purpose computer, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing a state machine that is in turn capable of implementing the processes described herein can be used to implement the systems and techniques according to this invention.

While the embodiments illustrated herein show the various components of the system co-located, it is to be appreciated that the various components of the system can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the following description, and for reasons of computational efficiency, the components of the system can be arranged at any location within a distributed network without affecting the operation of the system. Moreover, the components could be embedded in a dedicated image encoding and/or decoding machine.

Furthermore, it should be appreciated that the various links, including the channel, connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

Furthermore, the disclosed methods may readily be implemented in software using object or object-oriented software development environments that provide portable source code that can be used on a variety of computer or workstation platforms. Alternatively, the disclosed system may be implemented partially or fully in hardware using standard logic circuits or, for example, a VLSI design. Whether software or hardware is used to implement the systems in accordance with this invention is dependent on the speed and/or efficiency requirements of the system, particular function, and the particular software or hardware systems or microprocessor or microcomputer systems being utilized. The systems and methods illustrated herein can be readily implemented in hardware and/or software using any suitable systems or structures, devices and/or software, such as JAVA®, by those of ordinary skill in the applicable art from the functional description provided herein and with a basic general knowledge of the computer and data or image processing arts.

Moreover, the disclosed methods may be readily implemented in software, e.g., as a computer program product, executed on a programmed general purpose computer, a special purpose computer, a microprocessor, or the like. In these instances, the systems and methods of this invention can be implemented as a program embedded on a personal computer such as a JAVA®, CGI or Perl script, as a resource resigning on a server or graphics workstation, as a routine embedded in a dedicated image system, or the like. The systems and methods of this invention can also be implemented by physically incorporating this system and method into a software and/or hardware system, such as the hardware and software systems of a computer. Such computer program products and systems can be distributed and employ a client-server architecture. While exemplary embodiments disclosed herein use still imagery to enable principles of the invention, these principles can also be applied to, e.g., video, medical imagining, transmission of images to wireless devices.

I claim:

1. A computer implemented method of image processing, the method comprising:

transforming, by the computer, pixel intensity data of an image into a wave data description of the image by applying a two-dimensional Fourier transform to the pixel intensity data;

selecting, by the computer, a subset of the wave data description;

decorrelating, by the computer, the subset of the wave data description by applying a one-dimensional Fourier transform thereto;

modeling, by the computer, the decorrelated subset of the wave data description to obtain autoregressive (AR) model parameters thereof, wherein the AR model parameters constitute a compressed representation of the image;

computing, by the computer or a different computer, a synthesized spectrum representation directly from the AR model parameters without the intervening step of computing a Fourier transform of the AR model parameters, wherein the synthesized spectrum representation corresponds to a set of pixel intensity data of the image; and reconstituting the image by computing a Fourier transform of the synthesized spectrum representation.

2. A non-transitory computer-readable medium for image processing comprising:

a transform module that transforms pixel intensity data of an image into a wave data description of the image by applying a two-dimensional Fourier transform to the pixel intensity data;

a modeling module that:
 selects a subset of the wave data description;
 decorrelates the subset of the wave data description by applying a one-dimensional Fourier transform thereto; and
 models the decorrelated subset of the wave data description to obtain autoregressive (AR) model parameters thereof, wherein the AR model parameters constitute a compressed representation of the image;

a synthesis module that synthesizes a spectrum representation directly from the AR model parameters without the intervening step of computing a Fourier transform of the AR model parameters, wherein the synthesized spectrum representation corresponds to a set of pixel intensity data of the image; and a reconstituting module that reconstitutes the image by computing a Fourier transform of the synthesized spectrum representation.

* * * * *